(12) United States Patent
Gao

(10) Patent No.: US 12,229,547 B2
(45) Date of Patent: Feb. 18, 2025

(54) MINIPROGRAM CLASSIFICATION METHOD, APPARATUS, AND DEVICE, AND COMPUTER-READABLE STORAGE MEDIUM

(71) Applicant: Tencent Technology (Shenzhen) Company Limited, Shenzhen (CN)

(72) Inventor: Xuanxuan Gao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 330 days.

(21) Appl. No.: 17/732,382

(22) Filed: Apr. 28, 2022

(65) Prior Publication Data
US 2022/0253307 A1  Aug. 11, 2022

Related U.S. Application Data

(63) Continuation of application No. PCT/CN2021/096021, filed on May 26, 2021.

(30) Foreign Application Priority Data

Jun. 23, 2020 (CN) .......................... 202010583738.0

(51) Int. Cl.
*G06F 8/70* (2018.01)
*G06N 5/022* (2023.01)

(52) U.S. Cl.
CPC .............. *G06F 8/70* (2013.01); *G06N 5/022* (2013.01)

(58) Field of Classification Search
CPC .................................. G06F 8/70; G06N 5/022
See application file for complete search history.

(56) References Cited

U.S. PATENT DOCUMENTS

| 7,107,543 | B2* | 9/2006 | Berry | H04L 67/75 |
| | | | | 715/744 |
| 8,954,933 | B2* | 2/2015 | Bullard | G06F 11/368 |
| | | | | 717/125 |
| 11,099,972 | B2* | 8/2021 | Puszkiewicz | G06F 11/3612 |
| 11,734,165 | B1* | 8/2023 | Schreiber | G06F 11/3688 |
| | | | | 717/124 |

(Continued)

FOREIGN PATENT DOCUMENTS

| CN | 106778266 A | 5/2017 |
| CN | 107729927 A | 2/2018 |
| CN | 111222137 A | 6/2020 |

OTHER PUBLICATIONS

Tencent Technology, ISR, PCT/CN2021/096021, Aug. 27, 2021, 2 pgs.

(Continued)

*Primary Examiner* — Douglas M Slachta
(74) *Attorney, Agent, or Firm* — Morgan, Lewis & Bockius LLP

(57) ABSTRACT

A computing device obtains mini-program code of a to-be-classified mini-program. The computing device runs the mini-program code to obtain dynamic features of the to-be-classified mini-program during the running process. The device uses the dynamic features as inputs for a trained classifier model, to obtain classification information of the to-be-classified mini-program. The device stores the classification information of the to-be-classified mini-program.

20 Claims, 5 Drawing Sheets

(56) References Cited

U.S. PATENT DOCUMENTS

| | | | | |
|---|---|---|---|---|
| 2008/0155515 A1* | 6/2008 | Stewart | ............... | G06F 11/3664 |
| | | | | 714/E11.208 |
| 2010/0106732 A1* | 4/2010 | Atallah | ................ | G06F 16/907 |
| | | | | 707/E17.02 |
| 2013/0291111 A1* | 10/2013 | Zhou | ..................... | G06F 21/566 |
| | | | | 726/23 |
| 2015/0199515 A1* | 7/2015 | Qureshi | ................ | G06F 21/566 |
| | | | | 726/22 |
| 2015/0212927 A1* | 7/2015 | N'Gum | ................ | G06F 11/368 |
| | | | | 717/125 |
| 2016/0232352 A1* | 8/2016 | Chen | ..................... | G06F 21/316 |
| 2017/0031808 A1* | 2/2017 | Gillaspie | ............. | G06F 11/3692 |
| 2018/0365125 A1* | 12/2018 | Mola | .................... | G06F 11/323 |
| 2019/0163907 A1* | 5/2019 | Scofield | ................. | G06F 21/53 |
| 2019/0222499 A1 | 7/2019 | Chen et al. | | |
| 2019/0354682 A1* | 11/2019 | Finkelshtein | ......... | G06F 21/565 |
| 2020/0082083 A1* | 3/2020 | Choi | ..................... | G06N 20/00 |
| 2020/0210575 A1* | 7/2020 | Huang | ................. | G06F 21/554 |
| 2020/0293184 A1* | 9/2020 | Makovsky | .............. | G06F 9/451 |
| 2021/0191696 A1* | 6/2021 | Ibarra Von Borstel | ... | G06F 8/36 |
| 2021/0271587 A1* | 9/2021 | Miller | .................... | G06N 20/00 |
| 2021/0390011 A1* | 12/2021 | Cser | .................... | G06F 11/3688 |
| 2021/0397546 A1* | 12/2021 | Cser | ....................... | G06V 10/82 |

OTHER PUBLICATIONS

Tencent Technology, WO, PCT/CN2021/096021, Aug. 26, 2021, 3 pgs.

Tencent Technology, IPRP, PCT/CN2021/096021, Dec. 13, 2022, 4 pgs.

\* cited by examiner

MINIPROGRAM CLASSIFICATION METHOD, APPARATUS, AND DEVICE, AND COMPUTER-READABLE STORAGE MEDIUM

CROSS-REFERENCE TO RELATED APPLICATIONS

This application is a continuation application of PCT Patent Application No. PCT/CN2021/096021, entitled "APPLET CLASSIFICATION METHOD, APPARATUS AND DEVICE, AND COMPUTER READABLE STORAGE MEDIUM" filed on May 26, 2021, which claims priority to Chinese Patent Application No. 202010583738.0, filed with the State Intellectual Property Office of the People's Republic of China on Jun. 23, 2020, and entitled "APPLET CLASSIFICATION METHOD, APPARATUS, DEVICE, AND COMPUTER-READABLE STORAGE MEDIUM", all of which are incorporated herein by reference in their entirety.

FIELD OF THE TECHNOLOGY

This application relates to the field of mini-program classification technologies, and relates to, but is not limited to, a mini-program classification method, apparatus, and device, and a computer-readable storage medium.

BACKGROUND OF THE DISCLOSURE

A mini-program (e.g., an applet) is an application form between a conventional H5 webpage and a conventional native Android/IOS application. The mini-program need not be downloaded and installed to be used. Compared with a dedicated client, the mini-program saves an installation process and achieves a dream of "applicable at your fingertips", and so it has a very wide range of users and developers.

At present, the mini-program may be divided into a non-service mini-program and a service-provisioning mini-program. The non-service (e.g., service-free) mini-program is a mini-program that only presents (e.g., displays) some basic information, such as company introduction or resume presentation, without actually providing other actual services. The service-provisioning mini-program (e.g., a service applet) is a mini-program that can provide actual services (e.g., practical services) such as a reservation service, a food ordering service, and a check-in service. To present mini-programs that can provide actual services to the user when the user searches for the mini-programs, the mini-programs may be classified when being released to recognize non-service mini-programs.

SUMMARY

Embodiments of this application provide a mini-program classification method, apparatus, and device, and a computer-readable storage medium. A mini-program is classified by using dynamic features of the mini-program, to improve the accuracy of a classification result.

The technical solutions in the embodiments of this application are implemented as follows:

The embodiments of this application provide a mini-program classification method, applicable to a mini-program classification device, the method including:

obtaining mini-program code of a to-be-classified mini-program;

running the mini-program code to obtain dynamic features of the to-be-classified mini-program during running;

inputting the dynamic features into a trained classifier model to obtain classification information of the to-be-classified mini-program; and storing the classification information of the to-be-classified mini-program.

The embodiments of this application provide a mini-program classification apparatus, including:

a first obtaining module, configured to obtain mini-program code of a to-be-classified mini-program;

a running module, configured to run the mini-program code to obtain dynamic features of the to-be-classified mini-program during running;

a first determining module, configured to input the dynamic features into a trained classifier model to obtain classification information of the to-be-classified mini-program; and a storage module, configured to store the classification information of the to-be-classified mini-program.

The embodiments of this application provide a mini-program classification device, including:

a memory, configured to store executable instruction; and a processor, configured to implement, when executing the executable instructions stored in the memory, the foregoing mini-program classification method.

The embodiments of this application provide a non-transitory computer-readable storage medium, storing executable instructions, the executable instructions, when executed by a processor, implementing the foregoing mini-program classification method.

The embodiments of this application have the following beneficial effects:

After mini-program code of a to-be-classified mini-program is obtained, the mini-program code is run to obtain dynamic features of the to-be-classified mini-program during running, the dynamic features are then used as inputs for a trained classifier model, to determine classification information of the to-be-classified mini-program, and the classification information is stored. Because the dynamic features are extracted during running of the mini-program, actual performance features of the mini-program during use can be reflected, and the mini-program is then classified by using the dynamic features of the mini-program, thereby improving the accuracy of a classification result.

DESCRIPTION OF EMBODIMENTS

Figure 1:
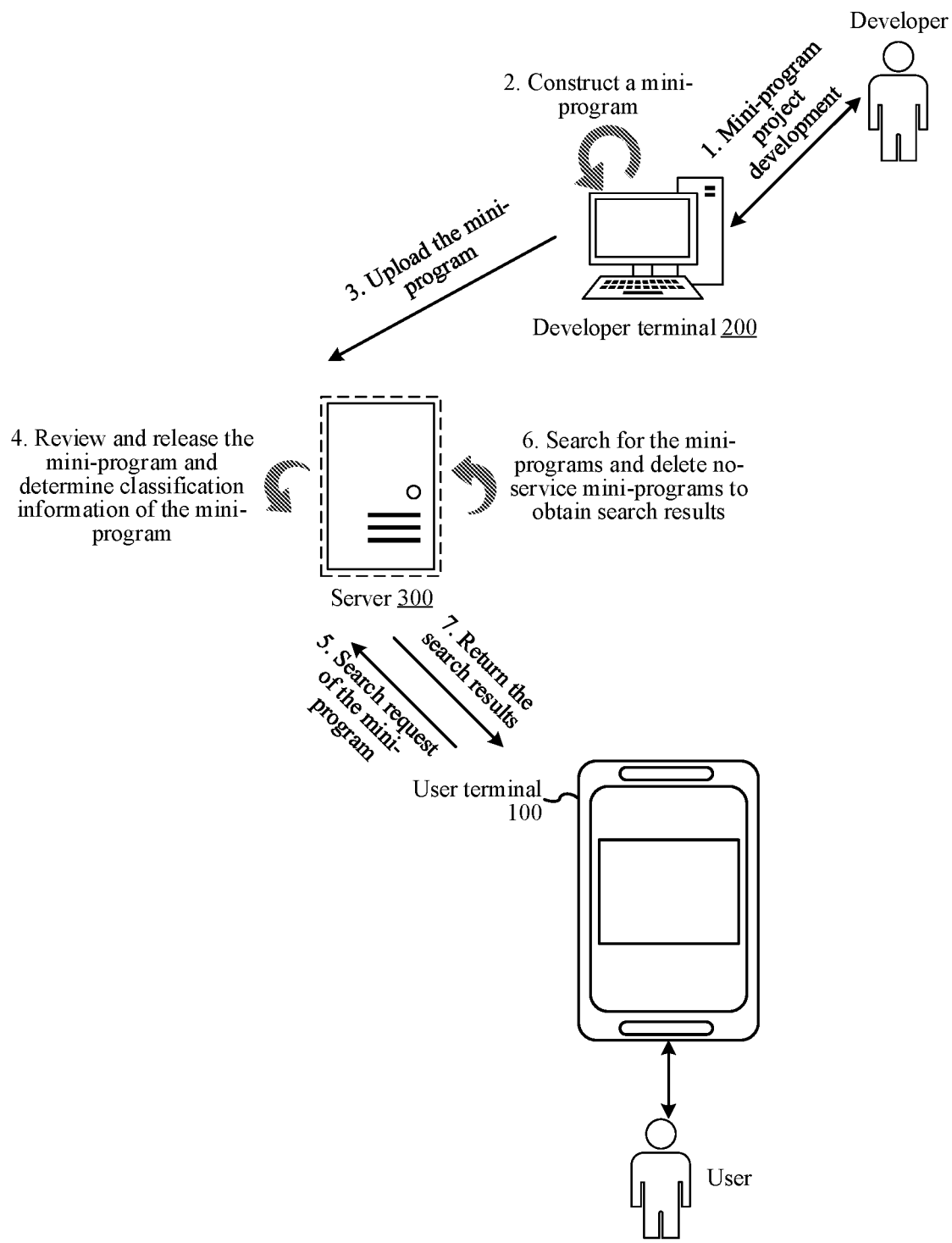
FIG. 1 is a schematic diagram of a network architecture of a mini-program classification system according to an embodiment of this application.

To make the objectives, technical solutions, and advantages of embodiments of this application clearer, the following describes the embodiments of this application with reference to the accompanying drawings. The described embodiments are not to be considered as a limitation to the embodiments of this application. All other embodiments obtained by a person of ordinary skill in the art without creative efforts fall within the protection scope of the embodiments of this application.

In the following descriptions, involved "some embodiments" describe a subset of all possible embodiments. However, it may be understood that the "some embodiments" may be the same subset or different subsets of all the possible embodiments, and may be combined with each other without conflict. Unless otherwise defined, meanings of all technical and scientific terms used in the embodiments of this application are the same as those usually understood by a person skilled in the art to which the embodiments of this application belong. Terms used in the embodiments of this application are merely intended to describe objectives of the embodiments of this application, but are not intended to limit this application.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

1) A mini-program, also referred to as a network application, is software downloaded by a client (such as a browser or any client embedded with a browser core) through a network (such as the Internet), and is interpreted and executed in a browser environment of the client. The mini-program is an application form between a conventional H5 webpage and a conventional native Android/IOS application. For example, network applications for implementing various services such as air ticket purchase and riding code may be downloaded and run in a social network client.

2) Accuracy rate, as an indicator for evaluating the performance of a classification model or a machine learning model, is represented by using a percentage of a correct prediction result to a total quantity of samples.

The accuracy rate is expressed as: accuracy rate=(TP+TN)/(TP+TN+FP+FN). If TP is predicted to be 1, and an actual value is 1, the prediction is correct; if FP is predicted to be 1, and an actual value is 0, the prediction is wrong; if FN is predicted to be 0, and an actual value is 1, the prediction is wrong; and if TN is predicted to be 0, and an actual value is 0, the prediction is correct.

Although the accuracy rate can determine a total correct rate, the accuracy rate cannot be used as a good indicator for measuring the result when there are unbalanced samples.

3) Precision, also referred to as a precision rate, is discussed in terms of a prediction result, and a meaning of the precision is a probability that all samples predicted to be positive are actually positive samples.

The precision is expressed as: precision=TP/(TP+FP).

4) A recall rate is discussed in terms of an original sample, and a meaning of the recall rate is a probability that samples that is actually positive are predicted to be positive samples.

The recall rate is expressed as: recall rate=TP/(TP+FN).

5) F1-score: In the F1-score, both precision and a recall rate are considered, so that the two can simultaneously reach highest, and achieve a balance.

The F1-score is expressed as: F1-score=2*precision*recall rate/(precision+recall rate).

6) A receiver operating characteristic (ROC) curve is used for evaluating advantages and disadvantages of a binary classifier. Compared with evaluation indicators such as the accuracy rate, the recall rate, and the F-score, the ROC curve has such a good feature: when a distribution of positive and negative samples in a test set changes, the ROC curve can remain unchanged.

7) An area under curve (AUC) represents an area under a ROC curve, and is used for determining advantages and disadvantages of a model. As shown in the ROC curve, an area for connecting a diagonal line is just 0.5. A meaning of the diagonal line is to randomly determine a prediction result, and coverage of positive samples and coverage of negative samples are both 50%. In addition, a steeper ROC curve is better. Therefore, an ideal value is 1, that is, a square is formed. Therefore, a value of the AUC is generally between 0.5 and 1.

In order to better understand a mini-program classification method provided in the embodiments of this application, the mini-program classification method in the related technology is first described.

In the related technology, when a mini-program is classified, an adopted method is a method based on static statistical features and rules. That is, a quantity of keys in mini-program static code is counted, and a mini-program in which the quantity of keys is less than a specified value is used as a non-service mini-program.

Due to a difference between the mini-program static code and online page presentation, and a limitation of single-feature division by rules, this classification method leads to more misjudgments and omissions.

Based on this, in a mini-program classification method based on dynamic features provided in the embodiments of this application, after source code of a mini-program is obtained, the source code is executed to run the mini-program to obtain original dynamic features of the mini-program, valid dynamic features are extracted and constructed, and the mini-program is classified based on the dynamic features of the mini-program.

Exemplary applications of a mini-program classification device provided in the embodiments of this application are described below. The mini-program classification device provided in the embodiments of this application may be implemented as any terminal with a screen display function such as a notebook computer, a tablet computer, a desktop computer, a mobile device (such as a mobile phone, a portable music player, a personal digital assistant, a dedicated messaging device, or a portable game device), or an intelligent robot, or may be implemented as a server. An exemplary application when the mini-program classification device is implemented as the server is described below.

Referring to FIG. 1, FIG. 1 is a schematic diagram of a network architecture of a mini-program classification system according to an embodiment of this application. As shown in FIG. 1, the mini-program classification system includes a user terminal 100, and a developer terminal 200, and a server 300. A mini-program developer deploys a development framework of the mini-program on the developer terminal 200 (such as a user terminal such as a computer) to complete code development for the mini-program. The mini-program may be configured to implement services provided by various service providers, such as a riding code service, an express service, and online shopping. A tool for constructing the mini-program is provided in the development framework. The tool encapsulates code in a project pf the mini-program into one or more JavaScript files that are runnable in a browser environment of a client, and uploads the JavaScript files to the server 300 to request review and perform releasing after the review is passed by the server 300. The server 300 may be a server that carries service logic of a service provider, for example, a background server that carries a riding service of a riding service provider. Exemplarily, in FIG. 1, the mini-program is stored in the server 300 corresponding to a first client. In some embodiments, the server 300 may alternatively be a dedicated storage server, for example, a node with a shortest link to a user terminal in a content delivery network (CDN).

After receiving a mini-program file, the server 300 reviews the mini-program, runs the mini-program after the review is passed and sequentially triggers events, obtains dynamic features during running of the mini-program, and further classifies the mini-program according to the dynamic features. In some embodiments, the mini-program is divided into a non-service mini-program and a service-provisioning mini-program. When receiving a mini-program search request sent by the user terminal 100, the server 300 searches, based on a search keyword carried in the search request, mini-programs matching the search keyword, and obtains classification information of the matched mini-programs. When the classification information of the matched mini-programs is non-service mini-programs, these non-service mini-programs may be filtered out as shown in FIG. 1, and search results including only the service-provisioning mini-programs are returned to the user terminal 100. Alternatively, in some embodiments, the server 300 may rank these non-service mini-programs after the service-provisioning mini-programs, and return sorted mini-programs to the user terminal 100.

In some embodiments, the user terminal 100 may send an access request for accessing a mini-program store to the server 300, and the server 300 determines, in response to the access request, a type of mini-program commonly used by the user terminal 100, where the type may be a type of games, shopping, travel, or the like, and determines, based on the determined type of mini-program commonly used, a service-provisioning mini-program matching the type of the mini-program commonly used by the user, which is carried in an access response and is returned to the user terminal 100 for the user to use.

Figure 2:
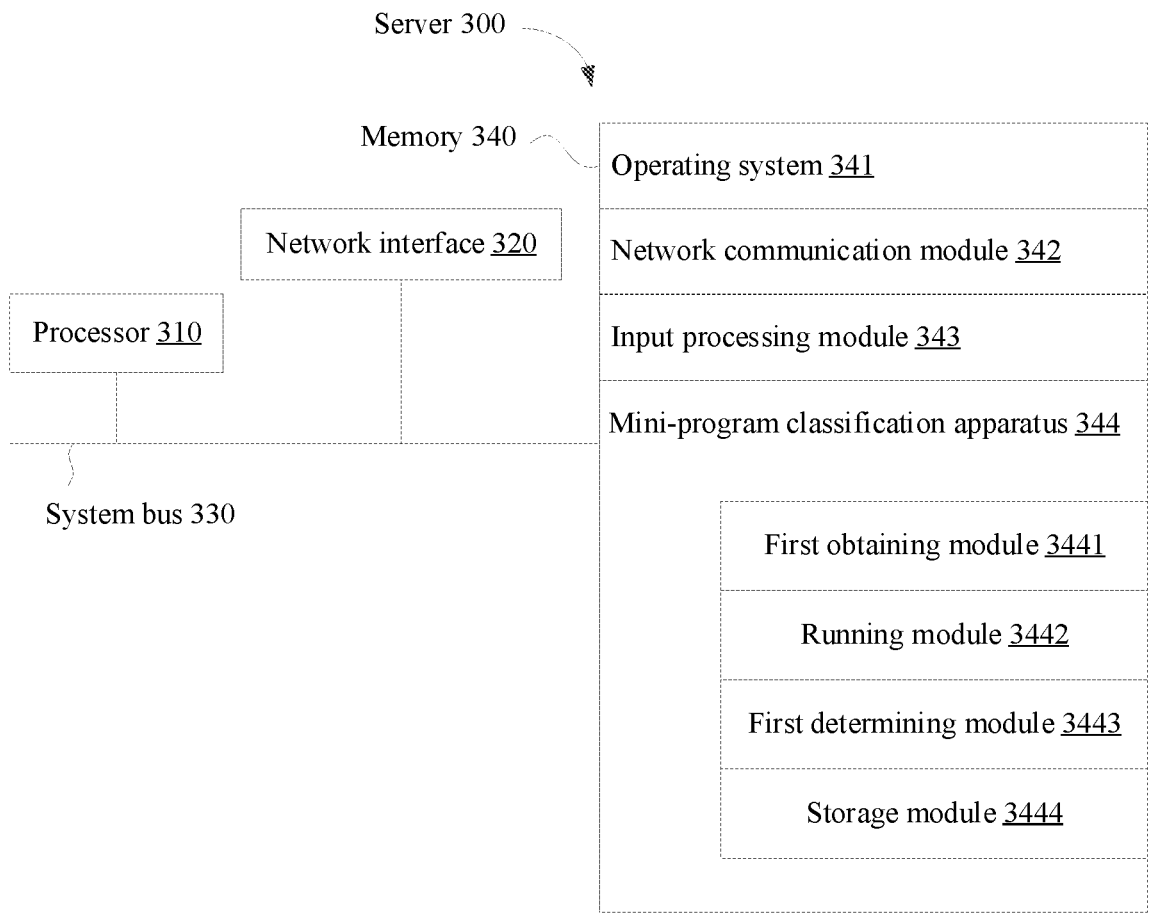
FIG. 2 is a schematic structural diagram of a server 300 according to an embodiment of this application.

Referring to FIG. 2, FIG. 2 is a schematic structural diagram of a server 300 according to an embodiment of this application. The server 300 shown in FIG. 2 includes: at least one processor 310, a memory 340, and at least one network interface 320. Components in the server 300 are coupled together by using a bus system 330. It may be understood that the bus system 330 is configured to implement connection and communication between the components. In addition to a data bus, the bus system 330 further includes a power bus, a control bus, and a status signal bus. However, for ease of clear description, all types of buses are marked as the bus system 330 in FIG. 2.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 340 may be a removable memory, a non-removable memory, or a combination thereof. Exemplary hardware devices include a solid-state memory, a hard disk drive, an optical disc driver, or the like. In some embodiments, the memory 340 includes one or more storage devices physically away from the processor 310. The memory 340 includes a volatile memory or a non-volatile memory, or may include a volatile memory and a non-volatile memory. The non-volatile memory may be a read-only memory (ROM), and the volatile memory may be a random access memory (RAM). The memory 340 described in this embodiment of this application is to include any other suitable type of memories. In some embodiments, the memory 340 may store data to support various operations. Examples of the data include a program, a module, and a data structure, or a subset or a superset thereof. The following provides descriptions by using examples.

An operating system 341 includes a system program configured to process various basic system services and perform a hardware-related task, for example, a framework layer, a core library layer, and a driver layer, and is configured to implement various basic services and process a hardware-related task.

A network communication module 342 is configured to reach another computing device through one or more (wired or wireless) network interfaces 320. Exemplary network interfaces 320 include: Bluetooth, wireless compatible authentication (Wi-Fi), a universal serial bus (USB), and the like.

An input processing module 343 is configured to detect one or more user inputs or interactions from one of the one or more input apparatuses 332 and translate the detected input or interaction.

In some embodiments, the apparatus provided in the embodiments of this application may be implemented by using software. FIG. 2 shows a mini-program classification apparatus 344 stored in the memory 340. The mini-program classification apparatus 344 may be a mini-program classification apparatus in the server 300, or may be software in a form such as a program and a plug-in, and includes the following software modules: a first obtaining module 3441, a running module 3442, a first determining module 3443, and a storage module 3444. These modules are logical modules, and may be randomly combined or divided according to a function to be performed. A function of each module is described below.

In some other embodiments, the apparatus provided in the embodiments of this application may be implemented by using hardware. For example, the apparatus provided in the embodiments of this application may be a processor in the form of a hardware decoding processor, programmed to perform the mini-program classification method provided in the embodiments of this application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Figure 3:
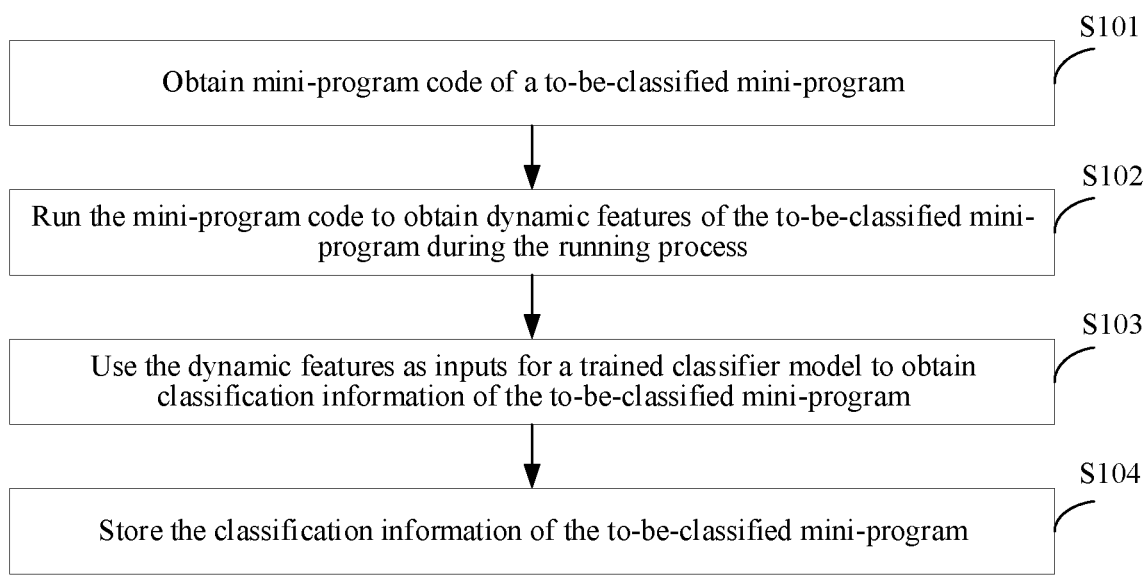
FIG. 3 is a schematic flowchart of an implementation of a mini-program classification method according to an embodiment of this application.

The mini-program classification method provided in the embodiments of this application is described with reference to an exemplary application and implementation of the server 300 provided in the embodiments of this application. The embodiments of this application provide a mini-program classification method, applicable to a server. Referring to FIG. 3, FIG. 3 is a schematic flowchart of an implementation of a mini-program classification method according to an embodiment of this application. Description is made with reference to steps shown in FIG. 3.

Step S101. Obtain mini-program code of a to-be-classified mini-program.

The to-be-classified mini-program herein may be submitted to the server by a mini-program developer after developing the mini-program code. During implementation of step S101, the server may obtain a to-be-classified miniprogram at intervals of a period of time, for example, may obtain a to-be-classified mini-program received during a period from a historical moment of 12 hours ago to a current moment at intervals of every 12 hours. In some embodiments, during implementation of step S101, a mini-program that is submitted by a developer terminal and is received by the server each time may alternatively be determined as a to-be-classified mini-program, and subsequent steps are performed, that is, the to-be-classified mini-program may be obtained in real time.

Step S102. Run the mini-program code to obtain dynamic features of the to-be-classified mini-program during running.

During implementation of step S102, the mini-program code may be rendered and dynamically run, preset events are triggered during running of the mini-program, and JS APIs called when the events are triggered are recorded, a quantity of controls bound to events that are successfully triggered is counted, screenshots and base64 encoding are separately performed on mini-program pages in which events are not started to be triggered and all events are triggered, obtained data is combined and is saved as a json file, and the dynamic features of the to-be-classified mini-program are further extracted through the json file.

In this embodiment of this application, the dynamic features of the mini-program may include statistical features, API features, and picture features, where the statistical features may include a quantity of events successfully triggered, a quantity of APIs, and a quantity of interactive controls; the API features include a total quantity of times that each API is called; and the picture features may include difference information between screenshots of the mini-program pages in which the events are not started to be triggered and all the events are triggered.

The interactive control may be a control that may present a page jump or an interactive page in response to a touch operation or a click operation during running of the mini-program.

Step S103. Input the dynamic features into a trained classifier model to obtain classification information of the to-be-classified mini-program.

The trained classifier model may include, but not limited to, logistic regression, a support vector machine, a decision tree, naive Bayes (NB), a K-nearest neighbor, a bagging K-nearest neighbor, a bagging decision tree, a random forest, adaboost, and a gradient boosting decision tree. In this embodiment of this application, the trained classifier model may only include trained one or more base classifiers. In this case, during implementation of step S103, the dynamic features may be used as inputs for the trained one or more base classifiers, to correspondingly obtain one or more initial predicted values, and a target predicted value is then determined according to the one or more initial predicted values. In an actual application, after a plurality of initial predicted values are obtained, a mean of the plurality of initial predicted values may be calculated to obtain a target predicted value. The target predicted value is a probability that the to-be-classified mini-program is a non-service mini-program, and classification information of the to-be-classified mini-program is finally determined according to the target predicted value. The classification information may be a service-provisioning mini-program or a non-service mini-program.

In some embodiments, the trained classifier model may further include not only a plurality of trained base classifiers, but also a trained integrated classifier. In this case, during implementation of step S103, the dynamic features may be used as inputs for the plurality of trained base classifiers, to correspondingly obtain a plurality of initial predicted values, the plurality of initial predicted values are then inputted into the integrated classifier for data integration to obtain a target predicted value, and classification information of the to-be-classified mini-program is finally determined according to the target predicted value.

Step S104. Store the classification information of the to-be-classified mini-program.

Herein, during implementation of step S104, a correspondence between an identifier of the to-be-classified mini-program and the classification information may be stored, or the classification information may be stored as attribute information of the to-be-classified mini-program.

In the mini-program classification method provided in the embodiments of this application, after mini-program code of a to-be-classified mini-program is obtained, the mini-program code is run to obtain dynamic features of the to-be-classified mini-program during running, and further based on the dynamic features and the trained classifier model, classification information of the to-be-classified mini-program is determined and the classification information is stored. Because the dynamic features are extracted during running of the mini-program, the dynamic features can reflect the events that can be actually triggered during use of the mini-program and the called APIs, and the mini-program is then classified by using the dynamic features of the mini-program, thereby improving the recall rate of a classification result.

In some embodiments, step S102 shown in FIG. 3 may be implemented by using the following steps:

Step S1021. Run the mini-program code to obtain a first mini-program interface image.

Herein, during implementation of step S1021, the mini-program code may be rendered and run. In this case, a mini-program interface may be obtained through rendering in a display interface of the server, to obtain a current first mini-program interface image. The first mini-program interface image is an interface image before any event is triggered.

Step S1022. Sequentially trigger preset events, obtain a target event that is successfully triggered, and obtain application program interface information called when triggering the target event and control information corresponding to the target event.

The preset event herein may be a single-click event, a double-click event, or a long-press event for each control in the to-be-classified mini-program. During implementation of step S1022, controls in the mini-program interface image are first recognized based on the mini-program interface image, preset events are then triggered based on the controls, a target event that is successfully triggered is obtained, and application program interface information called when the target event is triggered is obtained. The application program interface information at least includes an application program interface identifier and a number of calling times (e.g., invocations) of the application program interface. In this embodiment of this application, control information corresponding to the target event is further obtained, where if the target event is successfully triggered by a control, attribute information of the control is also the control information corresponding to the target event. The control information may include at least a control identifier.

In this embodiment of this application, after one event is successfully triggered, the mini-program interface may change. Therefore, after one event is successfully triggered, a mini-program interface image may be obtained again, controls in the current mini-program interface image are recognized, preset events are further triggered for the controls in the current mini-program interface image, and a target event that is successfully triggered, application program interface information called when the target event is triggered, and control information corresponding to the target event are obtained.

Step S1023. Obtain a second mini-program interface image after the preset events are triggered.

Herein, when all the preset events are triggered, a screenshot is taken to obtain the second mini-program interface image.

Step S1024. Determine the dynamic features of the to-be-classified mini-program during running based on a quantity of the target events, the application program interface information, the control information, the first mini-program interface image, and the second mini-program interface image.

Herein, during implementation of step S1024, a total number (e.g., quantity) of invocations of each application program interface may be determined based on the application program interface information, a number (e.g., quantity) of interactive controls is determined based on the control information, and image difference information between the first mini-program interface image and the second mini-program interface image is determined. The image difference information may be obtained by calculating a Hamming distance between the first mini-program interface image and the second mini-program interface image.

In some embodiments, calculating the Hamming distance between the first mini-program interface image and the second mini-program interface image may be implemented as follows: Size transformation is first performed on the first mini-program interface image and the second mini-program interface image, the first mini-program interface image and the second mini-program interface image are processed as images with a same size and a relatively small size, for example, may be scaled to a size of 8*8, or 16*16, and color simplification is then performed, for example, the scaled images may be converted into 64-level grayscale. That is, all pixels have only a total of 64 colors, and an average grayscale value is then calculated, grayscale of each pixel and an average value in the first mini-program image after the color simplification are compared with that of the mini-program image after the color simplification, and pixels with values greater than or equal to the average value are denoted by 1; and pixels with values less than the average value are denoted by 0. A hash value is further calculated, to obtain hash values corresponding to the first mini-program interface image and the second mini-program interface image respectively, and XOR calculation is then performed on the two hash values, to obtain the calculated Hamming distance between the first mini-program interface image and the second mini-program interface image.

After the total quantity of invocations of each application program interface is obtained (e.g., number of times each application program interface is called), a total number of application program interfaces called by the to-be-classified mini-program may be further determined. In this embodiment of this application, the dynamic features of the to-be-classified mini-program are determined based on the quantity of the target events, the total quantity of invocations of each application program interface, the total quantity of application program interfaces, the quantity of interactive controls, and the image difference information.

In the embodiments in which steps S1021 to S1024 are located, by running the mini-program, the dynamic features such as the total quantity of application program interfaces of the mini-program, the quantity of interactive controls, the total quantity of invocations (e.g., calling times) of each application program interface, and a quantity of the target events that may be triggered are obtained, to ensured that the obtained features can truly reflect an actual status of the mini-program. Therefore, when the classification information of the mini-program is determined by using the dynamic features, the recall rate of the classification result can be improved.

In some embodiments, the trained classifier model at least includes trained K first classifier models. Correspondingly, step S103 may be implemented by using the following steps:

Step S1031. Separately input the dynamic features into the K first classifier models to correspondingly obtain K initial predicted values.

K is a positive integer, that is, K is an integer greater than or equal to 1. The first classifier model may include, but not limited to, logistic regression, a support vector machine, a decision tree, NB, a K-nearest neighbor, a bagging K-nearest neighbor, a bagging decision tree, a random forest, adaboost, and a gradient boosting decision tree. The dynamic features of the to-be-classified mini-program are used as inputs for (e.g., separately inputted into) the trained K first classifier models, and the K first classifier models predict the to-be-classified mini-program, to correspondingly obtain K initial predicted values. The initial predicted value is an initial probability value that the to-be-classified mini-program is a non-service mini-program, and is a real number between 0 and 1.

Step S1032. Determine a target predicted value based on the K initial predicted values.

Herein, during implementation of step S1032, when K is 1, the initial predicted value is directly determined as the target predicted value. When K is an integer greater than 1, mean value processing may be performed on the K initial predicted values, to obtain the target predicted value. The mean value processing may be an arithmetic mean or a weighted mean.

In some embodiments, when K is an integer greater than 1, the first classifier model may be a base classifier model, the trained classifier model further includes a trained second classifier model, and the second classifier model is an integrated classifier model. Correspondingly, during implementation of step S1032, the K initial predicted values may be inputted into the second classifier model to perform integrated processing on the K initial predicted values, to obtain the target predicted value.

Step S1033. Determine the classification information of the to-be-classified mini-program based on the target predicted value and a preset classification threshold.

Herein, during implementation of step S1033, the classification information of the to-be-classified mini-program may be determined by determining a size relationship between the target predicted value and the classification threshold, where the classification information of the to-be-classified mini-program is determined as a first type of mini-program when the target predicted value is greater than the classification threshold. The classification information of the to-be-classified mini-program is determined as is a second type of mini-program when the target predicted value is less than or equal to the classification threshold. The first type of mini-program is a non-service mini-program, and the second type of mini-program is a service-provisioning mini-program.

Figure 4A:
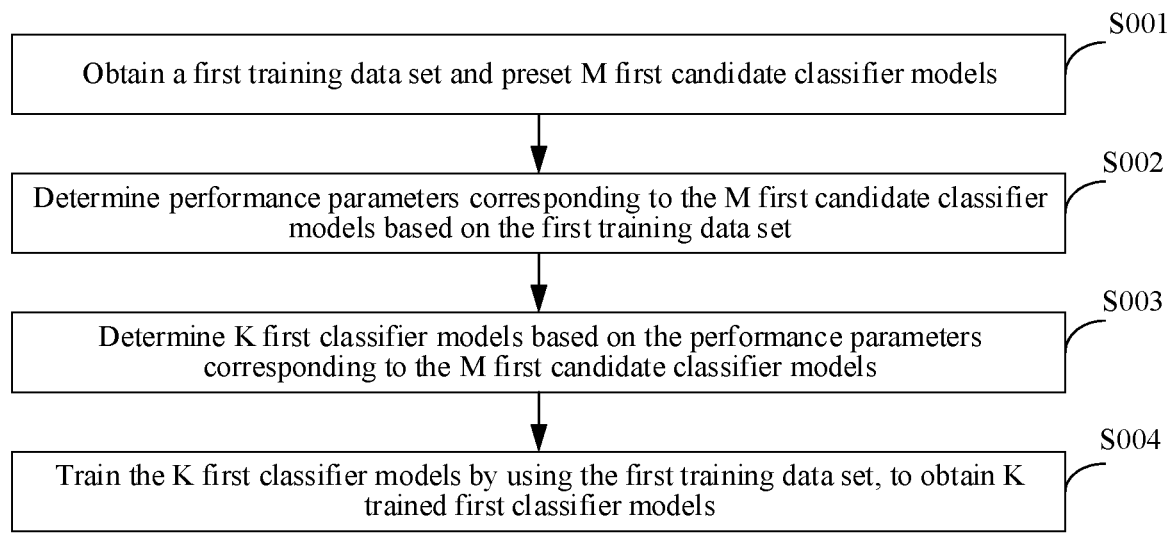
FIG. 4A is a schematic flowchart of an implementation of obtaining a trained classifier model according to an embodiment of this application.

In some embodiments, before step S103, a trained classifier model is obtained. During actual implementation, the trained classifier model may be obtained by using the following steps shown in FIG. 4A.

Step S001. Obtain a first training data set and preset M first candidate classifier models.

The first training data set includes dynamic features of a plurality of training mini-programs and label information of the plurality of training mini-programs, and the label information is used for representing whether the training mini-programs are non-service mini-programs or service-provisioning mini-programs. For example, when the training mini-programs are non-service mini-programs, the label information is 1, and when the training mini-programs are service-provisioning mini-programs, the label information is 0.

M is an integer greater than 1 and M is greater than or equal to K. The first candidate classifier model includes, but is not limited to, logistic regression, a support vector machine, a decision tree, NB, a K-nearest neighbor, a bagging K-nearest neighbor, a bagging decision tree, a random forest, adaboost, and a gradient boosting decision tree. During implementation of obtaining M first candidate classifier models, types of the M first candidate classifier models may be first determined, and optimal hyperparameters of the first candidate classifiers are then found by using a grid search method, to obtain the M first candidate classifier models.

Step S002. Determine performance parameters corresponding to the M first candidate classifier models based on the first training data set.

Herein, during implementation of step S002, the performance parameters of the M first candidate classifier models may be determined based on the first training data set by using an S-fold cross-validation method (for example, a ten-fold cross-validation method). For each first candidate classifier model, one or more performance parameters may be determined. The performance parameters include, but are not limited to, an accuracy rate, precision, a recall rate, an F1-score, a ROC, and an AUC. For example, for each first candidate classifier model, two performance parameters: an accuracy rate and the recall rate may be determined.

Step S003. Determine K first classifier models based on the performance parameters corresponding to the M first candidate classifier models.

Herein, in step S002, for each first candidate classifier model, if one performance parameter is determined, K first classifier models with best performance are determined based on the performance parameter. For example, for each first candidate classifier model, if one performance parameter: an accuracy rate is determined, during implementation of step S003, accuracy rates of the M first candidate classifier models may be sorted, to select K first classifier models with highest accuracy rates from the M first candidate classifier models.

In step S002, for each first candidate classifier model, if at least two performance parameters are determined, during implementation of step S003, one most concerned performance parameter may be selected from the at least two performance parameters, and K first classifier models are then determined from the M first candidate classifier models based on the most concerned performance parameter; or a plurality of most concerned performance parameters may be selected from the at least two performance parameters, and arithmetic average, weighted average, or a summation operation is then performed on the plurality of most concerned performance parameters, to determine K first classifier models from the M first candidate classifier models.

Step S004. Train the K first classifier models by using the first training data set, to obtain K trained first classifier models.

Herein, during implementation of step S004, the dynamic features of the plurality of training mini-programs in the first training data set may be separately inputted into K first classifier models to correspondingly obtain training predicted values, and differences between the training predicted values and actual label information are then determined according to the training predicted values and the label information of each training mini-program to separately adjust parameters of the K first classifier models until a preset training ending condition is met, to obtain the K trained first classifier models. The training ending condition may be that a preset quantity of training times is met, or may be that differences between the training predicted values and the actual label information may be less than a preset threshold.

Through the foregoing steps S001 to S004, after the first training data set and the M first candidate classifier models are obtained, K first classifier models with best performance may be first selected based on the performance parameters of the M first candidate classifier models, the K first classifier models are then trained based on the first training data set, to obtain trained K first classifier models, and the to-be-classified mini-program is further classified by using the trained K first classifier models, to determine the classification information of the to-be-classified mini-program.

Figure 4B:
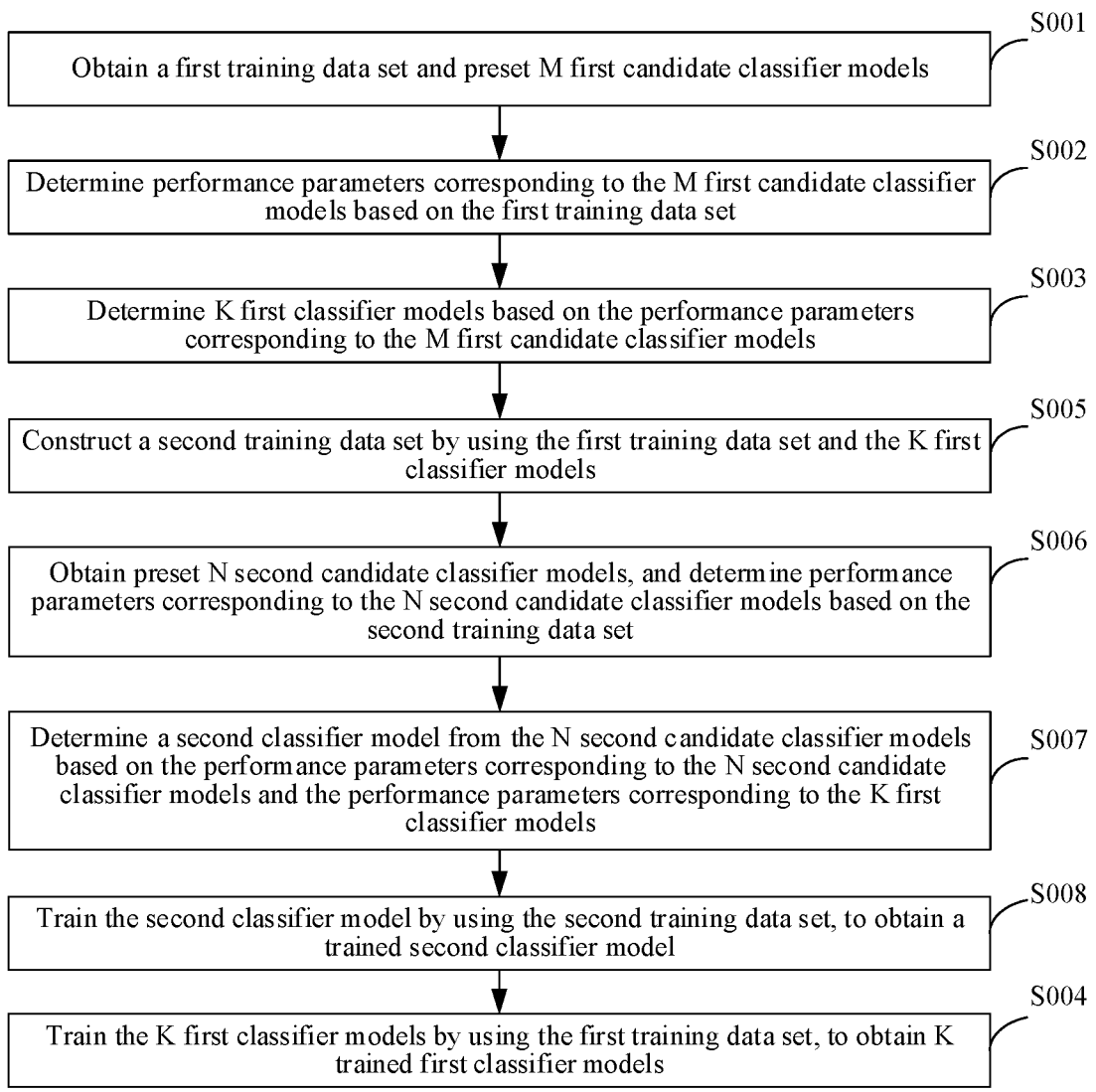
FIG. 4B is a schematic flowchart of another implementation of obtaining a trained classifier model according to an embodiment of this application.

In some embodiments, as shown in FIG. 4B, after step S003, the trained second classifier model may alternatively be obtained by using the following steps:

Step S005. Construct a second training data set by using the first training data set and the K first classifier models.

Herein, the second training data set includes: prediction information of the K first classifier models for the training mini-program and label information of the training mini-program, and the prediction information at least includes a predicted probability value that the training mini-program is a non-service mini-program.

Step S006. Obtain preset N second candidate classifier models, and determine performance parameters corresponding to the N second candidate classifier models based on the second training data set.

Herein, N is an integer greater than 1. During implementation of obtaining N second candidate classifier models, types of the N second candidate classifier models may be first determined, and optimal hyperparameters of the second candidate classifiers are then found by using the grid search method, to obtain the N second candidate classifier models.

During implementation of step S006, the performance parameters of the N second candidate classifier models may be determined based on the second training data set by using the S-fold cross-validation method (for example, the ten-fold cross-validation method). For each second candidate classifier model, one or more performance parameters may be determined. The performance parameters include, but are not limited to, an accuracy rate, precision, a recall rate, an F1-score, a ROC, and an AUC.

A type of the performance parameter determined in step S006 is the same as a type of the performance parameter determined in step S002. For example, if the accuracy rate and the recall rate corresponding to the first classifier model are determined in step S002, the accuracy rate and the recall rate of the second classifier model are also determined in step S006.

Step S007. Determine a second classifier model from the N second candidate classifier models based on the performance parameters corresponding to the N second candidate classifier models and the performance parameters corresponding to the K first classifier models.

Herein, step S007 at least includes the following two implementations:

In some implementations, the performance parameters of the N second candidate classifier models are sequentially compared with the performance parameters of the K first classifier models. Once it is determined that the performance parameters of a second candidate classifier model are all better than that of the K first classifier models, when a performance difference value between the second candidate classifier model and the K first classifier models is greater than a preset threshold, the second candidate classifier model is determined as the second classifier model.

In some implementations, once the performance parameters of the N second candidate classifier models are all better than that of the K first classifier models, the second candidate classifier model with best performance parameters is determined as the second classifier model.

In some embodiments, the performance parameters of the N second candidate classifier models are sequentially compared with the performance parameters of the K first classifier models. Once it is determined that the performance parameters of a second candidate classifier model are all better than that of the K first classifier models, the second candidate classifier model is determined as the second classifier model.

Step S008. Train the second classifier model by using the second training data set, to obtain a trained second classifier model.

Herein, during implementation of step S008, the prediction information of the K first classifier models in the second training data set for the training mini-program may be inputted into the second classifier model to obtain training predicted values of the second classifier model for the training mini-program, and differences between the training predicted values and actual label information are then determined according to the training predicted values and the label information of each training mini-program to adjust parameters of the second classifier models until a preset training ending condition is met, to obtain the trained second classifier model. The training ending condition may be that a preset quantity of training times is met, or may be that differences between the training predicted values and the actual label information may be less than a preset threshold.

In some embodiments, step S005 shown in FIG. 4B may be implemented by using the following steps:

Step S051. Divide the first training data set into P first training data subsets.

Herein, P is an integer greater than 1. A value of P is determined by using the S-fold cross-validation method used in step S002, where P=S. That is, if the ten-fold cross-validation method is used in step S002, the first training data set is divided into 10 first training data subsets in step S051.

Step S052. Determine an $i^{th}$ first training data subset as an $i^{th}$ test data set.

Herein, i=1, 2, . . . , P.

Step S053. Train the K first classifier models by using other first training data subsets, to obtain K trained first classifier models.

Herein, the other first training data subsets is (P−1) first training data subsets other than the $i^{th}$ first training data subset.

Step S054. Predict the $i^{th}$ test data set by using the K trained first classifier models, to obtain prediction information of the K first classifier models on a training mini-program in the $i^{th}$ test data set.

Herein, step S052 to step S054 are cyclically performed P times, to obtain prediction information of the K first classifier models on a training mini-program in $1^{st}$ to $P^{th}$ test data sets.

Step S055. Determine prediction information of the K first classifier models on a training mini-program in $1^{st}$ to $P^{th}$ test data sets and label information of the training mini-program as the second training data set.

Herein, each training mini-program corresponds to K training predicted values, and the K training predicted values represent predicted probability values of the K first classifier models that the training mini-program is a non-service mini-program.

In some embodiments, step S007 shown in FIG. 4B may include the following two implementations:

A first implementation may be implemented by using the following steps:

Step S071A. Sequentially compare the performance parameters corresponding to the N second candidate classifier models with the performance parameters corresponding to the K first classifier models.

Step S072A. In accordance with a determination that performance parameters corresponding to a $j^{th}$ second candidate classifier model are all better than the performance parameters corresponding to the K first classifier models, determine a performance difference value between the $j^{th}$ second candidate classifier model and the K first classifier models.

Step S073A. In accordance with a determination that the performance difference value is greater than a preset difference threshold, determine the $j^{th}$ second candidate classifier model as the second classifier model.

j is an integer between 1 and N. When the performance difference value is less than or equal to the difference threshold, performance parameters between a $(j+1)^{th}$ second candidate classifier model and the K first classifier models continue to be compared.

In the first implementation, the second classifier model may be determined without comparing all the N second classifier models. However, in the first implementation, it cannot be ensured that the determined second classifier model is one with best performance in the N second candidate classifier models.

A second implementation may be implemented by using the following steps:

Step S071B. Determine Q second target classifier models based on the performance parameters corresponding to the N second candidate classifier models and the performance parameters corresponding to the K first classifier models.

Herein, performance parameters corresponding to the second target classifier models are all better than the performance parameters corresponding to the K first classifier models.

Step S072B. Separately determine Q performance difference values between the Q second target classifier models and the K first classifier models.

Step S073B. Determine the second classifier model from the Q second target classifier models based on the Q performance difference values.

Herein, during implementation of step S073B, one with best performance may be determined from the Q second target classifier models based on the Q performance difference values as the second target classifier model.

In the second implementation, Q second target classifier models with all performance better than K first classifier models are first determined from the N second candidate classifier models, and one with best performance is then determined from the Q second target classifier models as the second classifier model. Compared with the first implementation, the second implementation requires a larger calculation amount, but the second classifier model with best performance may be determined. In an actual application, whether to use the first implementation or the second implementation may be determined according to an actual requirement.

During actual application, after the mini-program developer completes the development of the mini-program through a development environment provided by the developer terminal, the mini-program is sent to the server for review before being released. After receiving a mini-program file, the server reviews the mini-program. In addition, the server runs the mini-program after the review is passed and sequentially triggers events, obtains dynamic features during running of the mini-program, further classifies the mini-program according to the dynamic features, and stores classification information of the mini-program. The classification information of the mini-program may be a non-service mini-program or a service-provisioning mini-program. When receiving a mini-program search request sent by the user terminal, the server searches, based on a search keyword carried in the search request, mini-programs matching the search keyword, and obtains classification information of the matched mini-programs. When the classification information of the matched mini-programs is non-service mini-programs, these non-service mini-programs may be filtered out, and search results including only the service-provisioning mini-programs are returned to the user terminal. In some embodiments, the server may release the mini-program to a mini-program store after the review of the mini-program is passed, then classify the mini-program based on the dynamic features of the mini-program after the release, and store the classification information of the mini-program.

Figure 5:
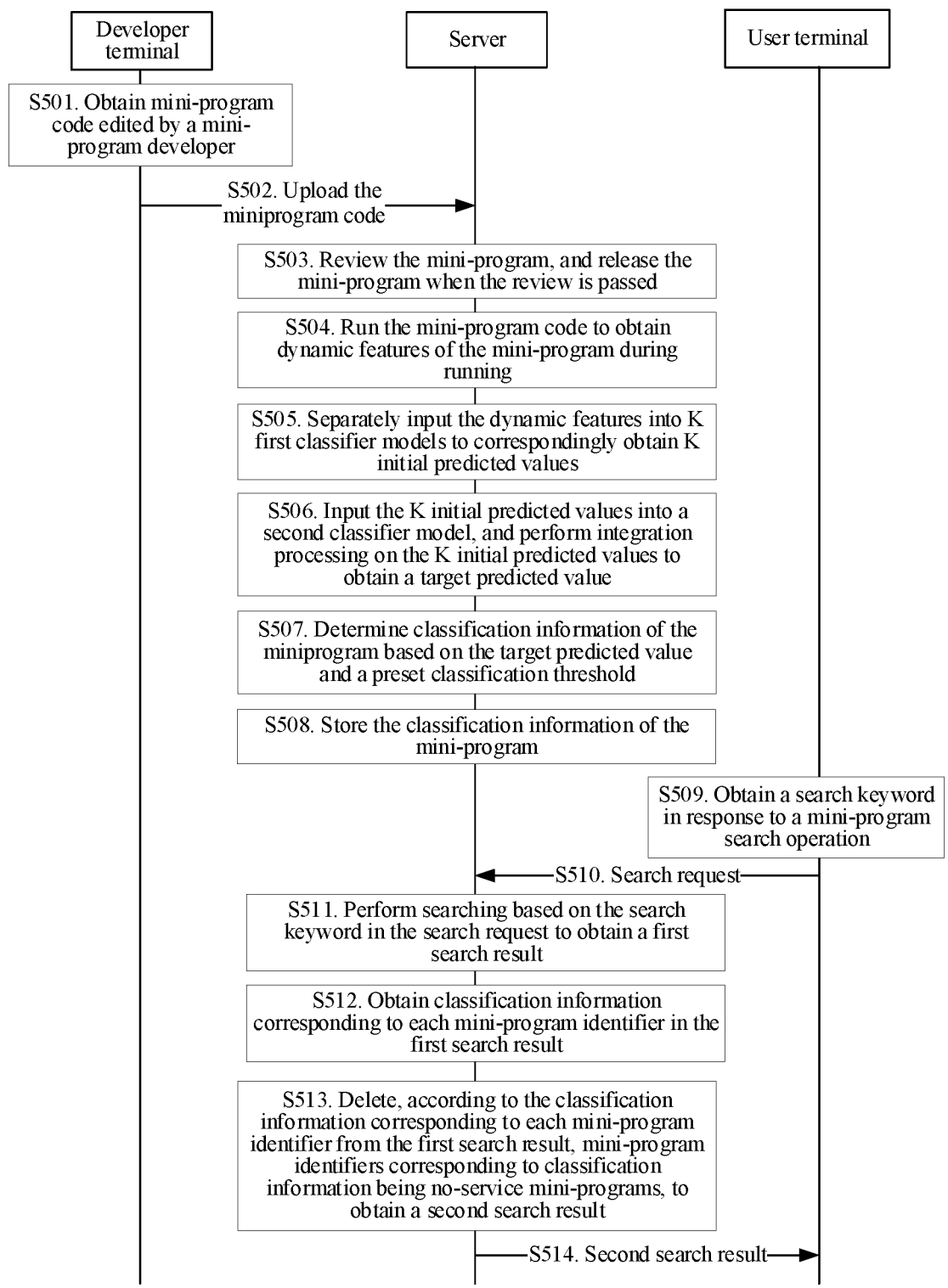
FIG. 5 is a schematic flowchart of another implementation of a mini-program classification method according to an embodiment of this application.

The embodiments of this application further provide a mini-program classification method, applicable to the foregoing application scenario. FIG. 5 is a schematic flowchart of another implementation of a mini-program classification method according to an embodiment of this application. Steps are described below with reference to FIG. 5.

Step S501. A developer terminal obtains mini-program code edited by a mini-program developer.

In this embodiment of this application, the developer terminal provides a mini-program development environment or a mini-program development platform. A mini-program developer may edit mini-program code through the mini-program development environment or the mini-program development platform, to implement mini-program development.

Step S502. The developer terminal sends mini-program code whose development is completed to a server based on a received upload operation.

Herein, during implementation of step S502, after completing the development of the mini-program code, the mini-program developer may encapsulate the mini-program code into one or more JavaScript files that are runnable in a browser environment of a client, and upload the one or more JavaScript files to the server.

Step S503. The server reviews the mini-program, and releases the mini-program when the review is passed.

Herein, during implementation of reviewing the mini-program, the server may check whether mini-program content conforms to rules, for example, illegal content involving rumors, fraud, gambling, and the like, and may further check whether the mini-program code has defects (bugs), the function is complete, and so on. After the review of the mini-program is passed, the mini-program is released to the mini-program store or a navigation website, that is, the user may search and use the mini-program.

Step S504. The server runs the mini-program code to obtain dynamic features of the mini-program during running.

Step S505. The server separately inputs the dynamic features into K first classifier models to correspondingly obtain K initial predicted values.

K is an integer greater than 1. The first classifier model corresponds to the base classifier in other embodiments, and the initial predicted value is a probability value that the mini-program is a non-service mini-program, and is a real number between 0 and 1.

Step S506. The server inputs the K initial predicted values into a second classifier model, and performs integration processing on the K initial predicted values to obtain a target predicted value.

Herein, the second classifier model corresponds to the integrated classifier in other embodiments, and is configured to perform integration processing on the K initial predicted values to obtain a final target predicted value.

Step S507. The server determines classification information of the mini-program based on the target predicted value and a preset classification threshold.

Herein, during implementation of step S507, the classification information of the to-be-classified mini-program may be determined by determining a size relationship between the target predicted value and the classification threshold, where the classification information of the to-be-classified mini-program is determined as a first type of mini-program in accordance with a determination that the target predicted value is greater than the classification threshold. The classification information of the to-be-classified mini-program is determined as is a second type of mini-program in accordance with a determination that the target predicted value is less than or equal to the classification threshold. The first type of mini-program is a non-service mini-program, and the second type of mini-program is a service-provisioning mini-program.

Step S508. The server stores the classification information of the mini-program.

Herein, a correspondence between a mini-program identifier and the classification information may be stored, or the classification information may be stored as attribute information of the mini-program.

In some embodiments, the foregoing step S504 to step S508 may be performed after the review of the mini-program is passed and before the mini-program is released. That is, the classification information of the mini-program is determined before the mini-program is released, and the classification information of the mini-program and the mini-program files are released to the mini-program store together or successively.

Step S509. A user terminal obtains a search keyword in response to a mini-program search operation.

Step S510. The user terminal sends a search request to the server.

Herein, the search request carries the search keyword.

Step S511. The server performs searching based on the search keyword in the search request to obtain a first search result.

Herein, the server determines, based on the search keyword from mini-program identifiers stored in the server, mini-program identifiers matching the search keyword, and determines the mini-program identifiers as the first search result.

Step S512. The server obtains classification information corresponding to each mini-program identifier in the first search result.

Step S513. The server deletes, according to the classification information corresponding to each mini-program identifier from the first search result, mini-program identifiers corresponding to classification information being non-service mini-programs, to obtain a second search result.

Step S514. The server returns the second search result to the user terminal.

In the mini-program classification method provided in the embodiments of this application, after completing the development of the mini-program code, the mini-program developer sends the mini-program code to the server, and the server reviews the mini-program, and releases the mini-program after the review is passed. In addition, the server further runs the mini-program and sequentially triggers the preset events to obtain dynamic features of the mini-program during running, and further determines classification information of the mini-program according to the dynamic features of the mini-program and the trained first classifier models and the second classifier model. In this case, when the user terminal searches for the mini-program and sends the search request to the server, the server obtains the classification information of each first mini-program after determining the first mini-programs matching the search keyword, to delete the non-service mini-programs according to the classification information, and returns a search result of deleting the non-service mini-programs to the user terminal, thereby ensuring that the search results finally obtained by the user are all mini-programs that can provide the services.

In some embodiments, in a process of performing content portrayal analysis on the mini-program, the mini-program is classified to determine whether the mini-program is a non-service mini-program or a service-provisioning mini-program. "Non-service" refers to services provided to present some basic information, such as company introduction or resume presentation, and not provided other actual services.

The mini-program classification method provided in the embodiments of this application includes the following steps:

Step S601. Obtain original dynamic features of a mini-program.

The dynamic features of the mini-program is discussed in terms of static features. The static features of the mini-program are features that can be obtained through mining from static code of the mini-program, such as a quantity of controls, a document object model (DOM), or custom components. However, elements written in the static code are not necessarily rendered or called, and therefore a page that the mini-program actually presents to the user and the static code do not correspond to each other. The dynamic features of the mini-program are features that can be obtained when the mini-program code is rendered and then dynamically run, such as which events can be triggered, JS APIs called when events are triggered, or controls bound to events. This is actually simulating interaction between the user and the page. Therefore, the dynamic features can better reflect a real user interaction experience than the static features.

In addition to the dynamic features obtained directly from the dynamic code, it needs to be noted in non-service whether there is a change on the page that the user can see after the events are triggered. Therefore, it is also necessary to take a screenshot of the page before and after the events are triggered, for subsequent comparison.

In this embodiment of this application, when the original dynamic features of the mini-program are obtained, the mini-program code is rendered and dynamically run, the events are sequentially triggered, the JS APIs called when the events are triggered are recorded, a quantity of controls bound to the events that may be triggered is counted, screenshots and base64 encoding are separately performed on the mini-program pages before and after the events are triggered, all the foregoing features are combined and are saved as a json file, and the json file is stored to a database, for example, a MySQL database.

Step S602. Extract and construct valid dynamic features.

Herein, the extracted dynamic features may include statistical features, API features, and picture features, where the statistical features may further include a quantity of events that may be triggered, a quantity of APIs, and a quantity of interactive controls; the API features may include: a total quantity of times that each API is called, for example, may include: a total quantity of times that each API is called to obtain system information, a total number of times that each API is called to scan QR code, a total quantity of times that each API is called to display a message prompt box, and the like. The picture features may include a page screenshot when no event is triggered and a page screenshot after all events are triggered.

Step S603. Classify the mini-program based on the dynamic features of the mini-program.

Herein, during implementation of step S603, the obtained mini-program dynamic features may be inputted into a plurality of trained base classifier models, to obtain predicted values of each base classifier model for the mini-program, where the predicted value is a probability value that the mini-program is a non-service mini-program; and the predicted values are then inputted into the trained integrated classifier model to integrate the predicted values by using the integrated classifier model, to obtain a final predicted value. The final predicted value is also the probability value that the mini-program is a non-service mini-program. After the final predicted value is obtained, the final predicted value is compared with a preset classification threshold to obtain classification information of the mini-program. For example, if the final predicted value is greater than the classification threshold, it may be determined as a non-service mini-program, and if the final predicted value is less than the classification threshold, it may be determined as not a non-service mini-program.

The dynamic features extracted in this embodiment of this application are described below. Table 1 shows dynamic features of the mini-program extracted from the json file in this embodiment of this application:

TABLE 1

Features extracted from the json file in this embodiment of this application

| Feature class | Feature name | Variable name |
|---|---|---|
| Statistical feature | Quantity of events that may be triggered | Num_event |
| | Quantity of JS APIs | Num_api |
| | Quantity of interactive controls | Num_component |
| JS API feature | Obtain system information | getsysteminfo |
| | Scan QR code | Scancode |
| | Show a message prompt box | Showtoast |
| | Show a model dialog box | Showmodal |
| | Show an operation menu | showactionsheet |
| | Show navigation bar loading animation on a current page | shownavigationbarloading |
| | Dynamically set a title of the current page | setnavigationbartitle |
| | Set a page navigation bar color | setnavigationbarcolor |
| | Initiate an HTTPS network request | createrequesttask |
| | Download file resources to local | createdownloadtask |
| | Save a picture to a system album | saveimagetophotosalbum |
| | Choose a picture from a local album or take a picture with a camera | chooseimage |
| | Save a video to a system album | savevideotophotosalbum |
| | Play a voice | operatemusicplayer |
| | Obtain a current geographic location and speed | Getlocation |
| | Initiate an authorization request to a user in advance | Authorize |
| | Call a client mini-program setting interface and return an operation result set by the user | Opensetting |
| | Play a video | operatevideoplayer |
| Picture feature | Screenshot of a page when no event is triggered | Pic_0 |
| | Screenshot of a page after all events are triggered | Pic_1 |

The feature classes, the feature names, and the variable names of the dynamic features that need to be extracted from the j1son file are shown in Table 1.

In this embodiment of this application, based on the picture features, the following features shown in Table 2 are also constructed:

TABLE 2

Dynamic features constructed based on the picture features in this embodiment of this application

| Picture-based features | dHash value of Pic_0 | Hash_0 |
|---|---|---|
| | dHash value of Pic_1 | Hash_1 |
| | Hamming distance between Hash_0 and Hash_1 | Hash_diff |

In this embodiment of this application, during implementation of step S602, the statistical features and the JS API features in Table 1 and Hash_diff in Table 2 are reserved, Pic_0 and Pic_1 in Table 1 and Hash_0 and Hash_1 in Table 2 are removed, to obtain 22-dimensional dynamic features. The 22-dimensional dynamic features are inputted into the classifier model as input information in step S603, to determine classification information of the mini-program.

In this embodiment of this application, before step S603, the trained base classifier model and the integrated classifier model need to be first obtained by using the following steps:

Step S701. Collect data with label information, and construct a training set (X, y).

The label information herein is used for indicating whether the mini-program is a non-service mini-program or a service-provisioning mini-program. The label information may be 0 or 1. When the label information is 1, it indicates that the mini-program is the non-service mini-program, and when the label information is 0, it indicates that the mini-program is the service-provisioning mini-program.

The data with label information may be mini-program code. During implementation of step S701, after mini-program code with label information is collected, the mini-program code is run and rendered, dynamic features of the mini-program are obtained, and the training set (X, y) are further constructed according to the label information and dynamic features of the mini-program. $X \in R^{n \times 22}$, $y \in \{0, 1\}^{n \times 1}$, n indicates that there are n samples, and 22 is the 22-dimensional features extracted in step S602. If $y_i$ is an $i^{th}$ element of y, $y_i=1$ indicates that the $i^{th}$ is a positive sample, that is, a non-service mini-program; and if $y_i=0$ indicates that the $i^{th}$ is a negative sample, that is, not the non-service mini-program.

Step S702. Construct m classifiers.

The m classifiers include, but are not limited to, logistic regression, a support vector machine, a decision tree, NB, a K-nearest neighbor, a bagging K-nearest neighbor, a bagging decision tree, a random forest, adaboost, and a gradient boosting decision tree. In this embodiment of this application, optimal hyperparameters of each classifier may be found by using a grid search method, and performance of each classifier under the training set (X, y) is evaluated under the optimal hyperparameters through ten-fold cross-validation. The performance indicators include, but are not limited to, an accuracy rate, precision, a recall rate, an F1-score, a ROC, and an AUC.

Step S703. Select kclassifiers with best performance under a most concerned indicator from the m classifiers as base classifiers, and add a new classifier to perform stacking integration on the base classifiers.

Herein, if the most concerned indicator is the recall rate, k classifiers with highest recall rates are selected from the m classifiers as base classifiers, and a new classifier is added as an integrated classifier to perform stacking integration of the base classifiers. A type of the new classifier includes, but is not limited to, logistic regression, a support vector machine, a decision tree, NB, a K-nearest neighbor, a bagging K-nearest neighbor, a bagging decision tree, a random forest, adaboost, or a gradient boosting decision tree.

In some embodiments, step S703 may be implemented by using the following steps:

Step S7031. Divide the training set (X, y) into 10 parts. Under each base classifier, 9 parts are used as a training set to train the base classifier, a remaining 1 part is used as a test set and is inputted into the base classifier for prediction, to obtain a probability value of non-service, and this process is repeated 10 times.

Therefore, the original training set (X, y) is converted into $(X_1, y)$ through the k classifiers, where $X_1 \in R^{n \times k}$.

Step S7032. Add a classifier to integrate prediction results of the base classifiers.

Herein, during implementation of step S7032, types of candidate new classifiers may be preset. For example, there may be three types of candidate new classifiers, namely logistic regression, a support vector machine, and a decision tree. Optimal hyperparameters of each candidate new classifier are then found by using the grid search method, and performance of each candidate new classifier under the training set $(X_1, y)$ is evaluated under the optimal hyperparameters through ten-fold cross-validation. If performance of a specific candidate new classifier is worse than performance of at least one of the base classifiers, another candidate new classifier attempts again; and if performance of a specific candidate new classifier is better than performance of all base classifiers, the candidate new classifier may be determined as an integrated classifier, the base classifiers are trained by using (X, y), the integrated classifier is trained by using $(X_1, y)$, and the trained base classifiers and the trained integrated classifier are serialized.

In some embodiments, after performance parameters of each candidate new classifier are determined, the performance parameters of each candidate classifier may further be compared with the performance parameters of each base classifier, and a candidate new classifier optimal to each base classifier is determined as the integrated classifier from the candidate new classifiers.

In a solution using single-feature division by rules, the precision of recognizing the non-service mini-program is 95%, and the recall rate is 28.1%. Although the precision is very high, there is a large proportion of omissions, which is not applicable to low-quality filtering scenarios. By using the classification method provided in the embodiments of this application, the precision of recognizing the non-service mini-program is 77%, the recall rate is 84%, and 18% of the precision is exchanged for 56% of the recall rate, the precision and the recall rate are both relatively high, and the precision and the recall rate can be balanced by selecting a decision threshold, which is applicable to scenarios such as searching for low-quality filtering.

In the mini-program classification method provided in the embodiments of this application, the dynamic features of the mini-program are obtained during running, to classify the mini-program based on the dynamic features of the mini-program. In this way, misjudgments and omissions caused by a difference between the static code of the mini-program and the online page presentation and a limitation of single-feature division by rules can be avoided, thereby improving the overall classification performance.

The following continues to describe an exemplary structure of the mini-program classification apparatus 344 provided in the embodiments of this application implemented as a software module. In some embodiments, as shown in FIG. 2, the software module stored in the mini-program classification apparatus 344 of the memory 340 may be the mini-program classification apparatus of the server 300, including:

a first obtaining module 3441, configured to obtain mini-program code of a to-be-classified mini-program;

a running module 3442, configured to run the mini-program code to obtain dynamic features of the to-be-classified mini-program during running;

a first determining module 3443, configured to input the dynamic features into a trained classifier model to obtain classification information of the to-be-classified mini-program; and a storage module 3444, configured to store the classification information of the to-be-classified mini-program.

In some embodiments, the running module 3442 is further configured to:

run the mini-program code to obtain a first mini-program interface image;

sequentially trigger preset events, obtain a target event that is successfully triggered, and obtain application program interface information called when triggering the target event and control information corresponding to the target event;

obtain a second mini-program interface image after the preset events are triggered; and determine the dynamic features of the to-be-classified mini-program during running based on a quantity of the target events, the application program interface information, the control information, the first mini-program interface image, and the second mini-program interface image.

In some embodiments, the running module 3442 is further configured to:

determine a total quantity of calling times of each application program interface based on the application program interface information;

determine a quantity of interactive controls based on the control information;

determine image difference information between the first mini-program interface image and the second mini-program interface image; and determine the dynamic features based on the quantity of the target events, the total quantity of calling times of each application program interface, the quantity of interactive controls, and the image difference information.

In some embodiments, the trained classifier model at least includes trained K first classifier models. Correspondingly, the first determining module 3443 is further configured to:

separately input the dynamic features into the K first classifier models to correspondingly obtain K initial predicted values, K being an integer greater than 1;

determine a target predicted value based on the K initial predicted values; and determine the classification information of the to-be-classified mini-program based on the target predicted value and a preset classification threshold.

In some embodiments, the trained classifier model further includes a trained second classifier models. Correspondingly, the first determining module 3443 is further configured to:

input the K initial predicted values into the second classifier model, and perform integration processing on the K initial predicted values to obtain the target predicted value.

In some embodiments, the first determining module 3443 is further configured to:

determine the classification information of the to-be-classified mini-program as a first type of mini-program in accordance with a determination that the target predicted value is greater than the classification threshold; and determine the classification information of the to-be-classified mini-program as a second type of mini-program in accordance with a determination that the target predicted value is less than or equal to the classification threshold.

In some embodiments, the apparatus further includes:

a second obtaining module, configured to obtain a first training data set and preset M first candidate classifier models, the first training data set including dynamic features of a training mini-program and label information of the training mini-program, M being an integer greater than 2;

a second determining module, configured to determine performance parameters corresponding to the M first candidate classifier models based on the first training data set;

a third determining module, configured to determine K first classifier models based on the performance parameters corresponding to the M first candidate classifier models; and a first training module, configured to train the K first classifier models by using the first training data set, to obtain K trained first classifier models.

In some embodiments, the apparatus further includes:

a data construction module, configured to construct a second training data set by using the first training data set and the K first classifier models, the second training data set including: prediction information of the K first classifier models on the training mini-program and the label information of the training mini-program;

a third obtaining module, configured to obtain preset N second candidate classifier models, and determine performance parameters corresponding to the N second candidate classifier models based on the second training data set, N being an integer greater than 1;

a fourth determining module, configured to determine a second classifier model from the N second candidate classifier models based on the performance parameters corresponding to the N second candidate classifier models and the performance parameters corresponding to the K first classifier models; and a second training module, configured train the second classifier model by using the second training data set, to obtain a trained second classifier model.

In some embodiments, the data construction module is further configured to:

divide the first training data set into P first training data subsets, P being an integer greater than 1;

determine an $i^{th}$ first training data subset as an $i^{th}$ test data set, i=1, 2, ..., P;

train the K first classifier models by using other first training data subsets, to obtain K trained first classifier models, the other first training data subsets being (P−1) first training data subsets other than the $i^{th}$ first training data subset;

predict the $i^{th}$ test data set by using the K trained first classifier models, to obtain prediction information of the K first classifier models on a training mini-program in the $i^{th}$ test data set; and determine prediction information of the K first classifier models on a training mini-program in $1^{st}$ to $P^{th}$ test data sets and label information of the training mini-program as the second training data set.

In some embodiments, the fourth determining module is further configured to:

sequentially compare the performance parameters corresponding to the N second candidate classifier models with the performance parameters corresponding to the K first classifier models; and in accordance with a determination that performance parameters corresponding to a $j^{th}$ second candidate classifier model are all better than the performance parameters corresponding to the K first classifier models, determine a performance difference value between the $j^{th}$ second candidate classifier model and the K first classifier models; and in accordance with a determination that the performance difference value is greater than a preset difference threshold, determine the $j^{th}$ second candidate classifier model as the second classifier model, j being an integer between 1 and N.

In some embodiments, the fourth determining module is further configured to:

determine Q second target classifier models based on the performance parameters corresponding to the N second candidate classifier models and the performance parameters corresponding to the K first classifier models, performance parameters corresponding to the second target classifier model are all better than the performance parameters corresponding to the K first classifier models;

separately determine Q performance difference values between the Q second target classifier models and the K first classifier models; and determine the second classifier model from the Q second target classifier models based on the Q performance difference values.

The description of the apparatus in the embodiments of this application is similar to the description of the foregoing method embodiments. The apparatus embodiments have beneficial effects similar to those of the method embodiments and therefore details are not described. For technical details that are not disclosed in the apparatus embodiments, refer to the descriptions of the method embodiments of this application for understanding.

The embodiments of this application provide a storage medium storing executable instructions, the executable instructions, when executed by a processor, causing the processor to perform the methods, for example, the methods shown in FIG. 3, FIG. 4A, FIG. 4B, and FIG. 5 provided in the embodiments of this application.

The embodiments of this application provide a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, to cause the computer device to perform the foregoing mini-program classification method in the embodiments of this application.

In some embodiments, the storage medium may be a computer-readable storage medium, for example, a memory such as a ferromagnetic random access memory (FRAM), a ROM, a programmable read-only memory (PROM), an erasable programmable read-only memory (EPROM), an electrically erasable programmable read-only memory (EEPROM), a flash memory, a magnetic surface memory, an optic disc, or a compact disc read-only memory (CD-ROM); or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) document, stored in a file that is specially used for a program in discussion, or stored in the plurality of collaborative files (for example, be stored in files of one or modules, subprograms, or code parts). In an example, the executable instructions can be deployed for execution on one computing device, execution on a plurality of computing devices located at one location, or execution on a plurality of computing devices that are distributed at a plurality of locations and that are interconnected through a communication network.

The foregoing description is merely embodiments of this application and is not intended to limit the protection scope of this application. Any modification, equivalent replacement, or improvement made without departing from the spirit and range of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs feature extraction and/or model training. In practical application, the foregoing functions may be allocated to and completed by different functional modules according to requirements, that is, an inner structure of a device is divided into different functional modules to implement all or a part of the functions described above.

What is claimed is:

1. A mini-program classification method performed at a computing device, the method comprising:
   obtaining mini-program code of a to-be-classified mini-program;
   obtaining a first mini-program interface image by running the mini-program code;
   sequentially triggering preset events for a plurality of controls of the to-be-classified mini-program and obtaining a target event that is successfully triggered for each of the plurality of controls:
   obtaining a second mini-program interface image after the preset events are triggered;
   determining image difference information between the first mini-program interface image and the second mini-program interface image; and
   determining the dynamic features of the to-be-classified mini-program based on a plurality of successfully triggered target events and the plurality of controls of the to-be-classified mini-program and the image difference information between the first mini-program interface image and the second mini-program interface image;
   using the dynamic features as inputs for a trained classifier model and obtaining classification information of the to-be-classified mini-program; and
   storing the classification information of the to-be-classified mini-program.

2. The method according to claim 1, wherein the determining the dynamic features of the to-be-classified mini-program further comprises:
   obtaining application program interface information called when triggering each of the plurality of target events and the control information corresponding to the target event: and
   determining the dynamic features of the to-be-classified mini-program based on the application program interface information and the control information.

3. The method according to claim 2, wherein determining the dynamic features of the to-be-classified mini-program comprises:
   determining a total number of invocations of each application program interface based on the application program interface information;
   determining a number of interactive controls based on the control information; and
   determining the dynamic features based on the total number of invocations of each application program interface, and the number of interactive controls.

4. The method according to claim 1, wherein:
   the trained classifier model at least comprises trained first classifier models, wherein K is a positive integer;
   using the dynamic features as inputs for the trained classifier model to obtain classification information of the to-be-classified mini-program comprises:
      separately inputting the dynamic features into the K trained first classifier models to correspondingly obtain K initial predicted values, wherein K is a positive integer;
      determining a target predicted value based on the K initial predicted values; and
      determining the classification information of the to-be-classified mini-program based on the target predicted value and a preset classification threshold.

5. The method according to claim 4, wherein when K is an integer greater than 1, the trained classifier model further comprises a trained second classifier model, and correspondingly, determining the target predicted value based on the K initial predicted values comprises:
   using the K initial predicted values as inputs for the second classifier model; and
   performing integration processing on the K initial predicted values to obtain the target predicted value.

6. The method according to claim 4, wherein determining the classification information of the to-be-classified mini-program based on the target predicted value and the preset classification threshold comprises:
   determining the classification information of the to-be-classified mini-program as a first type of mini-program when the target predicted value is greater than the classification threshold; and determining the classification information of the to-be-classified mini-program as a second type of mini-program when the target predicted value is less than or equal to the classification threshold.

7. The method according to claim 4, further comprising:
obtaining a first training data set and preset M first candidate classifier models, the first training data set comprising dynamic features of a training mini-program and label information of the training mini-program, and M is an integer greater than 1;
determining performance parameters corresponding to the M first candidate classifier models based on the first training data set;
determining K first classifier models based on the performance parameters corresponding to the M first candidate classifier models; and
training the K first classifier models by using the first training data set, to obtain K trained first classifier models.

8. The method according to claim 7, further comprising:
constructing a second training data set by using the first training data set and the K first classifier models, the second training data set comprising: prediction information of the K first classifier models on the training mini-program and the label information of the training mini-program;
obtaining preset N second candidate classifier models, and determining performance parameters corresponding to the N second candidate classifier models based on the second training data set, wherein N is an integer greater than 1;
determining a second classifier model from the N second candidate classifier models based on the performance parameters corresponding to the N second candidate classifier models and the performance parameters corresponding to the K first classifier models; and
training the second classifier model by using the second training data set, to obtain a trained second classifier model.

9. The method according to claim 8, wherein the constructing a second training data set by using the first training data set and the K first classifier models comprises:
dividing the first training data set into P first training data subsets, P being an integer greater than 1;
determining an $i^{th}$ first training data subset as an $i^{th}$ test data set, wherein i is an integer with values from 1 to P;
training the K first classifier models by using other first training data subsets, to obtain K trained first classifier models, the other first training data subsets being (P−1) first training data subsets other than the $i^{th}$ first training data subset;
predicting the $i^{th}$ test data set by using the K trained first classifier models, to obtain prediction information of the K first classifier models on a training mini-program in the $i^{th}$ test data set; and
determining prediction information of the K first classifier models on a training mini-program in $1^{st}$ to $p^{th}$ test data sets and label information of the training mini-program as the second training data set.

10. The method according to claim 8, wherein determining the second classifier model from the N second candidate classifier models comprises:
sequentially comparing the performance parameters corresponding to the N second candidate classifier models with the performance parameters corresponding to the K first classifier models; and in accordance with a determination that performance parameters corresponding to a $j^{th}$ second candidate classifier model are all better than the performance parameters corresponding to the K first classifier models, determining a performance difference value between the $j^{th}$ second candidate classifier model and the K first classifier models; and
in accordance with a determination that the performance difference value is greater than a preset difference threshold, determining the $j^{th}$ second candidate classifier model as the second classifier model, wherein j is a positive integer with values from 1 to N.

11. The method according to claim 8, wherein determining the second classifier model from the N second candidate classifier models comprises:
determining Q second target classifier models based on the performance parameters corresponding to the N second candidate classifier models and the performance parameters corresponding to the K first classifier models, performance parameters corresponding to the second target classifier model are all better than the performance parameters corresponding to the K first classifier models, Q being an integer less than or equal to N;
separately determining Q performance difference values between the Q second target classifier models and the K first classifier models; and
determining the second classifier model from the Q second target classifier models based on the Q performance difference values.

12. A computing device, comprising:
one or more processors; and
memory storing one or more programs, the one or more programs comprising instructions that, when executed by the one or more processors, cause the one or more processors to perform operations comprising:
obtaining mini-program code of a to-be-classified mini-program;
obtaining a first mini-program interface image by running the mini-program code;
sequentially triggering preset events for a plurality of controls of the to-be-classified mini-program and obtaining a target event that is successfully triggered for each of the plurality of controls;
obtaining a second mini-program interface image after the preset events are triggered:
determining image difference information between the first mini-program interface image and the second mini-program interface image; and
determining the dynamic features of the to-be-classified mini-program based on a plurality of successfully triggered target events and the plurality of controls of the to-be-classified mini-program and the image difference information between the first mini-program interface image and the second mini-program interface image;
using the dynamic features as inputs for a trained classifier model and obtaining classification information of the to-be-classified mini-program; and
storing the classification information of the to-be-classified mini-program.

13. The computing device according to claim 12, wherein the determining the dynamic features of the to-be-classified mini-program further comprises:

obtaining application program interface information called when triggering each of the plurality of target events and the control information corresponding to the target event; and determining the dynamic features of the to-be-classified mini-program based on the application program interface information and the control information.

14. The computing device according to claim 13, wherein determining the dynamic features of the to-be-classified mini-program comprises:

determining a total number of invocations of each application program interface based on the application program interface information;

determining a number of interactive controls based on the control information; and determining the dynamic features based on the total number of invocations of each application program interface, and the number of interactive controls.

15. The computing device according to claim 12, wherein:

the trained classifier model at least comprises trained K trained first classifier models, wherein K is a positive integer;

using the dynamic features as inputs for the trained classifier model to obtain classification information of the to-be-classified mini-program comprises:

separately inputting the dynamic features into the K trained first classifier models to correspondingly obtain K initial predicted values, wherein K is a positive integer;

determining a target predicted value based on the K initial predicted values; and determining the classification information of the to-be-classified mini-program based on the target predicted value and a preset classification threshold.

16. The computing device according to claim 15, wherein when K is an integer greater than 1, the trained classifier model further comprises a trained second classifier model, and correspondingly, determining the target predicted value based on the K initial predicted values comprises:

using the K initial predicted values as inputs for the second classifier model; and performing integration processing on the K initial predicted values to obtain the target predicted value.

17. The computing device according to claim 15, wherein determining the classification information of the to-be-classified mini-program based on the target predicted value and the preset classification threshold comprises:

determining the classification information of the to-be-classified mini-program as a first type of mini-program when the target predicted value is greater than the classification threshold; and determining the classification information of the to-be-classified mini-program as a second type of mini-program when the target predicted value is less than or equal to the classification threshold.

18. A non-transitory computer-readable storage medium, storing a computer program, the computer program, when executed by one or more processors of a computing device, cause the one or more processors to perform operations comprising:

obtaining mini-program code of a to-be-classified mini-program;

obtaining a first mini-program interface image by running the mini-program code;

sequentially triggering preset events for a plurality of controls of the to-be-classified mini-program and obtaining a target event that is successfully triggered for each of the plurality of controls;

obtaining a second mini-program interface image after the preset events are triggered;

determining image difference information between the first mini-program interface image and the second mini-program interface image; and determining the dynamic features of the to-be-classified mini-program based on a plurality of successfully triggered target events and the plurality of controls of the to-be-classified mini-program and the image difference information between the first mini-program interface image and the second mini-program interface image;

using the dynamic features as inputs for a trained classifier model and obtaining classification information of the to-be-classified mini-program; and storing the classification information of the to-be-classified mini-program.

19. The non-transitory computer-readable storage medium according to claim 18, wherein:

the trained classifier model at least comprises trained K trained first classifier models, wherein K is a positive integer;

using the dynamic features as inputs for the trained classifier model to obtain classification information of the to-be-classified mini-program comprises:

separately inputting the dynamic features into the K trained first classifier models to correspondingly obtain K initial predicted values, wherein K is a positive integer;

determining a target predicted value based on the K initial predicted values; and determining the classification information of the to-be-classified mini-program based on the target predicted value and a preset classification threshold.

20. The non-transitory computer-readable storage medium according to claim 19, wherein when K is an integer greater than 1, the trained classifier model further comprises a trained second classifier model, and correspondingly, determining the target predicted value based on the K initial predicted values comprises:

using the K initial predicted values as inputs for the second classifier model; and performing integration processing on the K initial predicted values to obtain the target predicted value.

* * * * *